(12) United States Patent
Varela et al.

(10) Patent No.: US 8,276,925 B2
(45) Date of Patent: Oct. 2, 2012

(54) MOUNTING ARRANGEMENT FOR LOWER STEERING ARM

(75) Inventors: Tomaz D. Varela, Shelby Township, MI (US); Malcolm Green, Granville, OH (US); Xinyu Wen, Shelby Township, MI (US); Kou Yang, Goodrich, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 173 days.

(21) Appl. No.: 12/752,204

(22) Filed: Apr. 1, 2010

(65) Prior Publication Data

US 2011/0241304 A1    Oct. 6, 2011

(51) Int. Cl.
*B62D 7/18*    (2006.01)

(52) U.S. Cl. ............ 280/93.512; 280/124.125; 301/132; 180/438

(58) Field of Classification Search ............. 280/93.512, 280/93.502, 124.125, FOR. 110; 301/132, 301/135; 180/438; *B62D 7/18*
See application file for complete search history.

(56) References Cited

U.S. PATENT DOCUMENTS

| | | | |
|---|---|---|---|
| 1,755,628 A * | 4/1930 | Bijur | 184/6 |
| 5,052,528 A | 10/1991 | Sullivan | |
| 6,283,483 B1 * | 9/2001 | Johnson et al. | 280/86.758 |
| 6,357,956 B1 * | 3/2002 | Zebolsky et al. | 403/134 |
| 6,394,473 B1 | 5/2002 | Platner | |
| 6,561,307 B1 | 5/2003 | Brill et al. | |
| 6,568,697 B1 | 5/2003 | Brill et al. | |
| 6,585,275 B1 | 7/2003 | Carlstedt et al. | |
| 6,607,205 B2 | 8/2003 | Platner | |
| 6,612,390 B2 | 9/2003 | Bennett et al. | |
| 6,793,234 B2 | 9/2004 | Carlstedt et al. | |
| 6,827,359 B2 | 12/2004 | Barila | |
| 7,077,232 B2 | 7/2006 | Correia et al. | |
| 7,093,853 B2 | 8/2006 | Hasebe et al. | |
| 2007/0273119 A1 | 11/2007 | Stoia | |

\* cited by examiner

*Primary Examiner* — Paul N Dickson
*Assistant Examiner* — Keith Frisby
(74) *Attorney, Agent, or Firm* — Carlson, Gaskey & Olds, PC

(57) ABSTRACT

A knuckle includes a spindle to support a wheel and upper and lower bosses extending inwardly of the spindle. The lower boss includes a tie rod arm mount interface. A tie rod arm is received within the tie rod arm mount interface and a steer arm is positioned on an opposite side of the knuckle from the tie rod arm. The steer arm is fixed to the tie rod arm and includes an input mount interface to receive steering input to turn a wheel. The steer arm and tie rod arm are attached to each other with at least one fastener, or can be integrally formed together as a single-piece component.

12 Claims, 10 Drawing Sheets

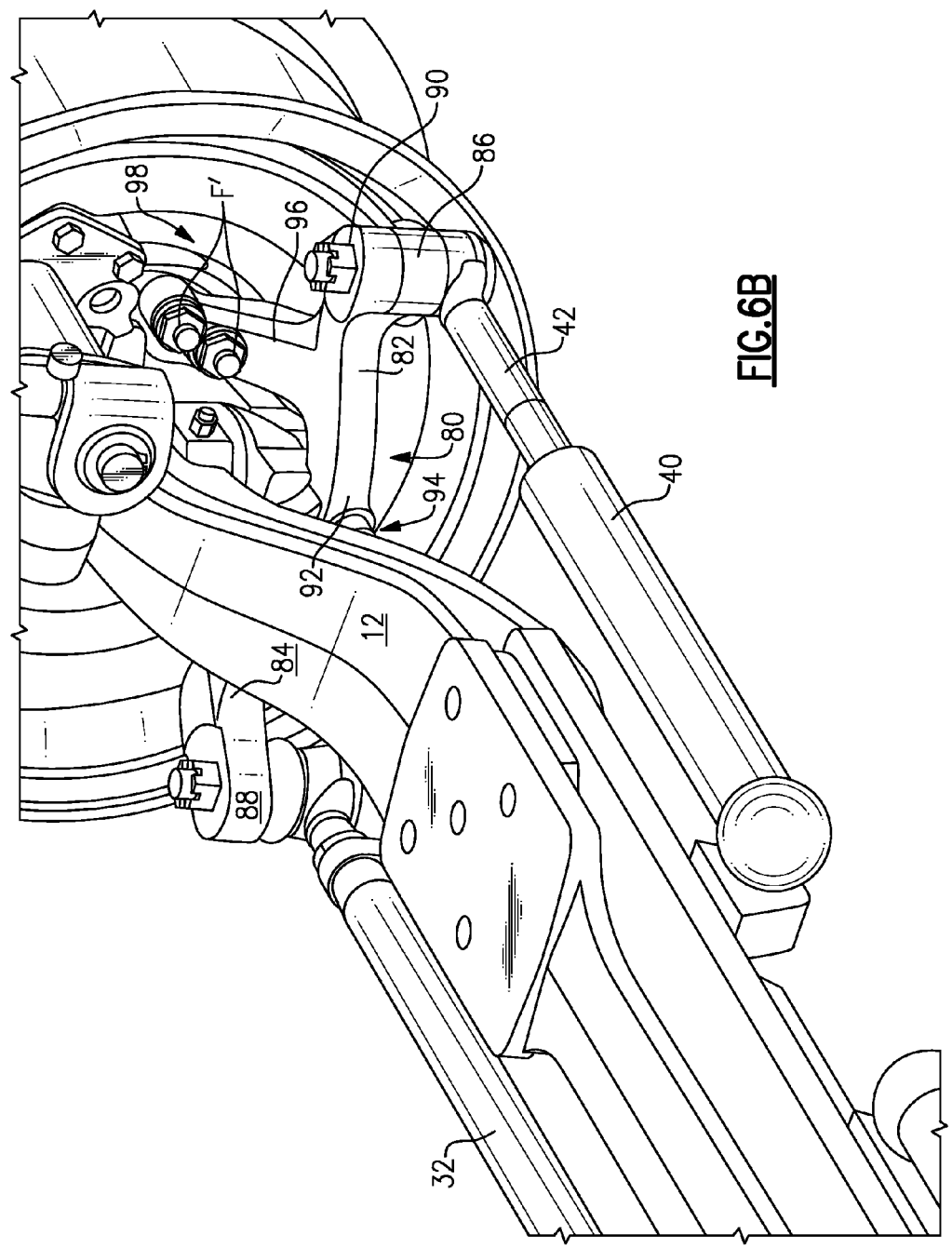

MOUNTING ARRANGEMENT FOR LOWER STEERING ARM

TECHNICAL FIELD

The subject invention relates to mounting arrangement for a steering arm.

BACKGROUND

Mechanical link steering systems typically include a knuckle at each wheel. Each knuckle includes a spindle, upper knuckle boss, lower knuckle boss, and mounting flange for connection to a wheel component. King pins extend through openings in the upper and lower knuckle bosses to connect each knuckle to an axle beam. The lower knuckle bosses for each knuckle are configured to receive a tie rod arm. The tie rod arms are connected to each other with a tie rod. In a conventional arrangement, one or both of the knuckles includes a steering arm that is received within the upper knuckle boss. Typically, the driver-side knuckle receives the steering arm. The steering arm is connected to receive steering input from the steering wheel through a steering link referred to as a drag link. As the steering arm steers the driver-side knuckle to execute a turning maneuver, the steering force is transferred to the opposite (passenger-side) wheel through the tie rod.

Hydrostatic steering systems, such as those used for off-highway applications such as tractors, loaders, harvesters, etc., are configured similarly to the mechanical link steering system discussed above, but utilize a steering cylinder input to a cylinder arm instead of a conventional steering arm. Hydrostatic steering systems and some mechanical link steering systems have a steering cylinder/steering link that is installed transversely, i.e. at the bottom of the knuckle on an opposite side of the tie rod arm. This transverse mounting arrangement is usually dictated by the vehicle configuration and packaging constraints.

For solid beam axles, when steering cylinders/steering links are mounted on the opposite side of the tie rod arms, limited attachment configurations are available for use with conventional knuckles. A different forged lower knuckle boss is required to provide bolt holes to attach the steering cylinder/steering link to the knuckle. The tooling for this forging is expensive.

SUMMARY

A knuckle includes a spindle to support a wheel and an upper and a lower boss extending inwardly of the spindle. The lower boss is spaced vertically below the upper boss and includes a tie rod arm mount interface. A tie rod arm is received within the tie rod arm mount interface, and a steer arm is positioned on an opposite side of the knuckle from the tie rod arm. The steer arm is fixed to the tie rod arm and includes an input mount interface to receive steering input to turn the wheel.

In one example, the tie rod arm is attached to the steer arm with at least one fastener.

In another example, the tie rod arm and steer arm are integrally formed together as a single-piece component.

These and other features of the present invention can be best understood from the following specification and drawings, the following of which is a brief description.

BRIEF DESCRIPTION OF THE DRAWINGS

FIG. 6B shows the knuckle of FIG. 6A from an opposite side of the axle assembly.

DETAILED DESCRIPTION

Figure 1:
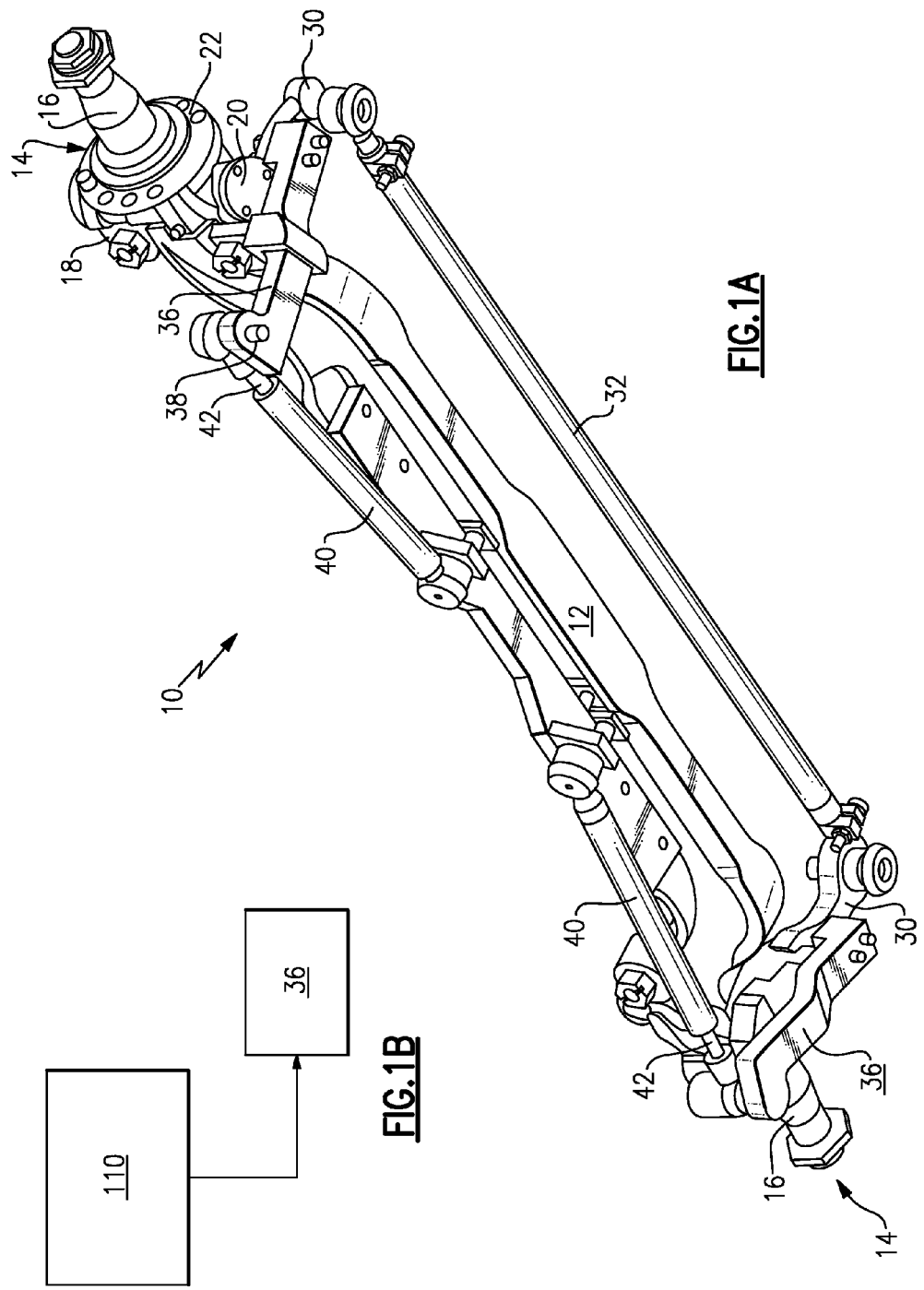
FIG. 1A is a perspective view of one example of an axle assembly including a knuckle with a mounted lower steer arm.
FIG. 1B is a schematic view showing an optional steering input for the configuration of FIG. 1A.

As shown in FIG. 1, an axle assembly 10 includes a solid beam axle 12 with knuckles 14 mounted at each axle end. Each knuckle 14 includes a spindle 16, an upper knuckle boss 18, a lower knuckle boss 20, and a mounting flange 22 for connection to a wheel component. The spindle 16 extends in an outboard direction to support a wheel. The mounting flange 22 is formed at an inboard end of the spindle 16 with the upper 18 and lower 20 knuckle bosses extending inwardly in an inboard direction from the mounting flange 22. King pins 24 (one is shown in FIG. 3) extend through aligned openings in the axle ends and the upper 18 and lower 20 knuckle bosses to connect each knuckle 14 to the axle 12.

The lower knuckle bosses 20 for each wheel are configured to receive a tie rod arm 30. The tie rod arms 30 are connected to each other with a tie rod 32. Each knuckle 14 also includes a steer arm 36 that is positioned on an opposite side of the knuckle 14 from the tie rod arm 30. The steer arm 36 is fixed to the tie rod arm 30 and includes an input mount interface 38 to receive steering input to turn an associated wheel.

Figure 2:
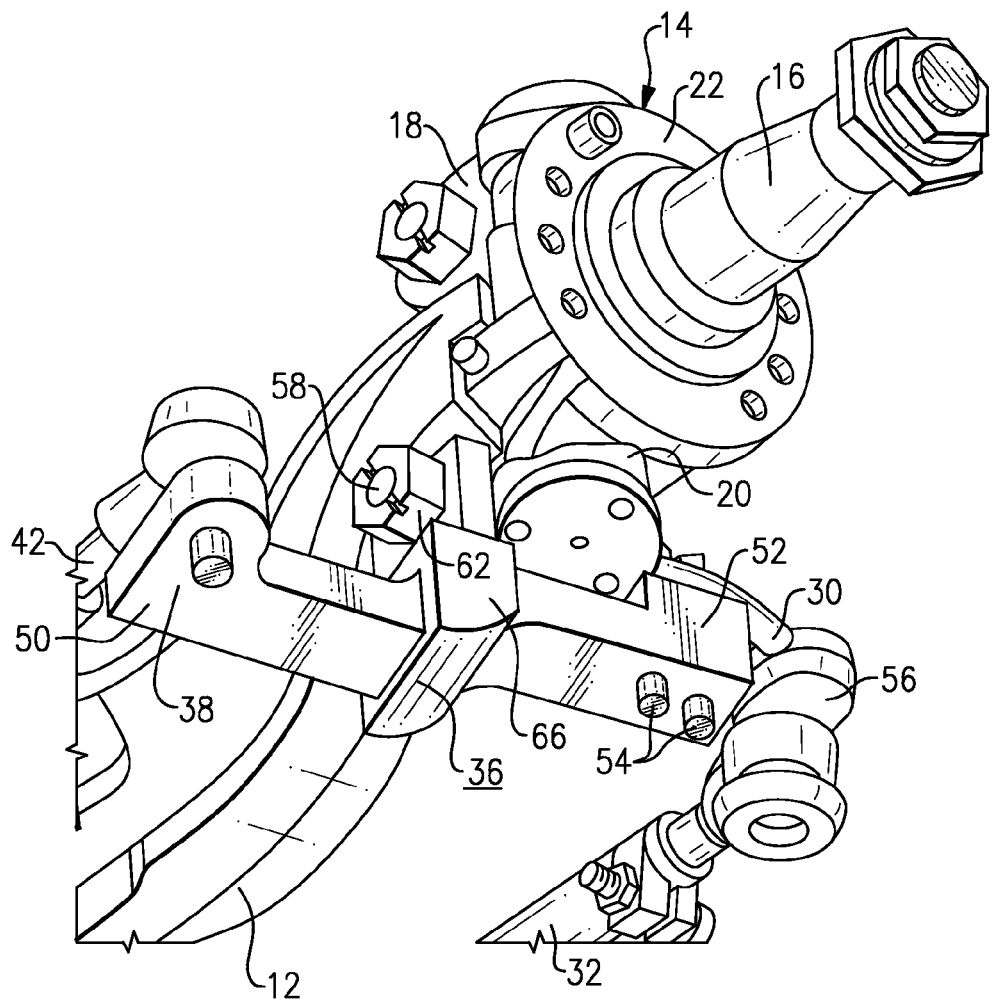
FIG. 2 is a magnified view of one of the knuckles of FIG. 1.
Figure 3:
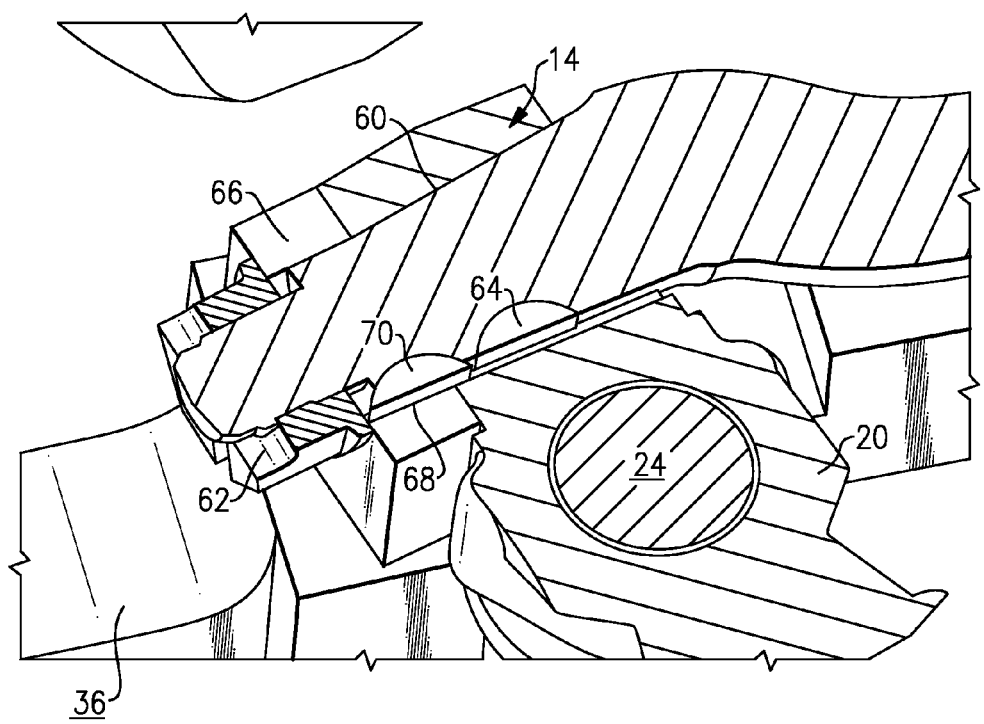
FIG. 3 is a cross-sectional view of the knuckle of FIG. 2.

In the example shown in FIGS. 1-3, each steer arm 36 is connected at the input mount interface 38 to a cylinder 40 as part of a hydrostatic steering system. The cylinder 40 includes a cylinder body fixed at one end with an extendible rod 42 extending outwardly of an opposite end. The rod 42 is connected to the steer arm 36. Movement of the rod 42 is controlled by steering input requests which in turn controls turning of the wheel. As each knuckle 14 includes a dedicated steer arm 36 and cylinder 40, steering forces can be distributed more evenly between both steering knuckles 14. The operation of a hydrostatic steering system is well known and will not be discussed in further detail. Optionally, the steering input could comprise a mechanical linkage assembly 110.

As shown in FIGS. 2-3, the steer arm 36 comprises a solid, rigid bar that includes a first arm end 50 that is coupled to the rod 42 and a second arm end 52 that is fixed to the tie rod arm 30 with one or more fasteners 54, such as bolts, screws, rivets, etc., for example. The tie rod arm 30 includes a first end 56 that is coupled to the tie rod 32 and a second end 58 that extends through an opening 60 formed in the lower boss 20 to protrude from the knuckle 14. In the example shown, the second arm end 52 of the steer arm 36 is secured to a bottom surface of the tie rod arm 30 at a position that is between the knuckle 14 and the first end 56 of the tie rod 30. The second end 58 of the tie rod 30 comprises a tapered section extending through the opening 60. The tapered section of the tie rod arm 30 terminates at a threaded portion such that the tie rod arm 30 can be secured to the knuckle 14 by a nut 62. A first draw key 64 further locks the tie rod arm 30 to the lower boss 20.

The steer arm 36 further includes an intermediate portion 66 positioned between the first 50 and second 52 arm ends. The intermediate portion 66 includes an opening 68 that is aligned with the opening 60 in the lower boss 20. In the example shown, the intermediate portion 66 comprises a flange that extends upwardly from a widened portion of the steer arm 36. The flange includes the opening 68. The second end 58 of the tie rod arm 30 extends through the opening 68 in the intermediate portion 66 such that the nut 62 clamps the intermediate portion to the lower boss 20 of the knuckle 14. A second draw key 70 is used to lock the steer arm 36 to the lower boss 20 of the knuckle 14.

This configuration offers the advantage of using a traditional knuckle to accommodate a lower steer arm configuration. The opening 60 in the lower boss does not have to be changed, instead the tie rod arm 30 is configured to have longer tapered/threaded sections that allow the steer arm 36 to be secured to the protruding portion of the tie rod arm 30. This offers significant flexibility in terms of a variety of available tie rod arms and associated strength requirements.

Figures 4A, 4B:
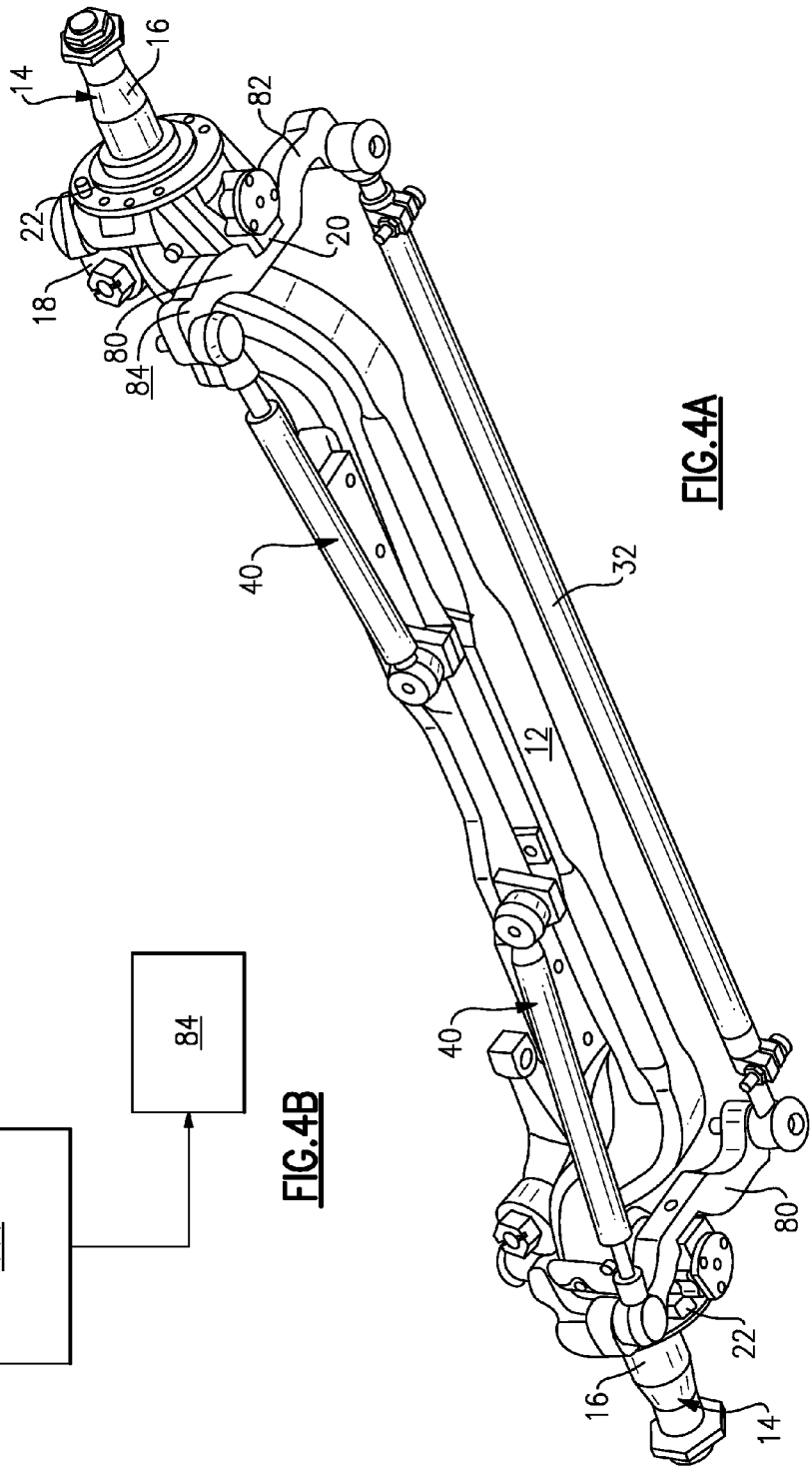
FIG. 4A is a perspective view of another example of an axle assembly including a knuckle with a mounted lower steer arm.
FIG. 4B is a schematic view showing an optional steering input for the configuration of FIG. 4A.
Figure 5:
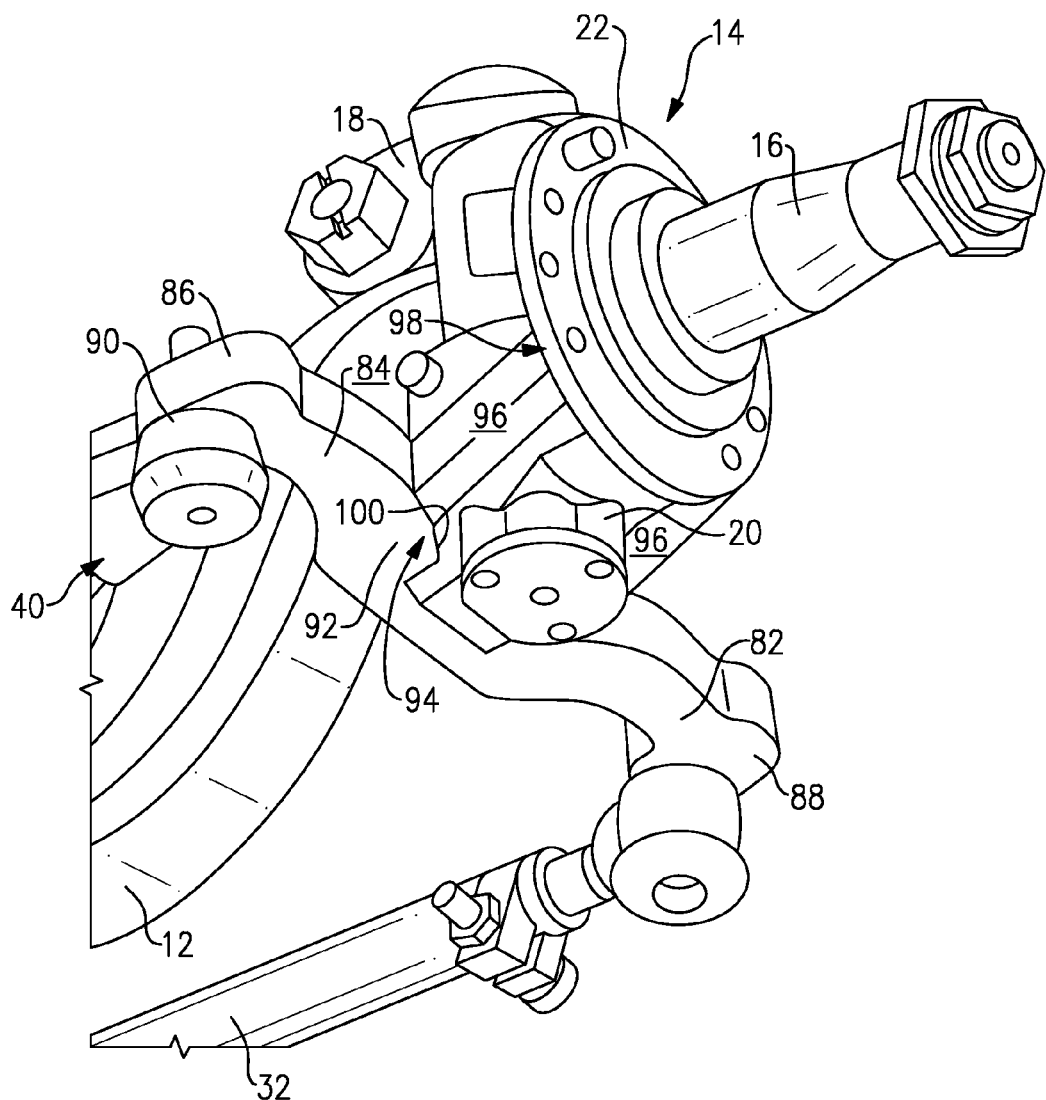
FIG. 5 is a magnified view of one of the knuckles of FIG. 4.

FIGS. 4-5 are similar to FIGS. 1-3 but show another example of a steer arm and tie rod arm configuration. In this configuration a single-piece component 80 is formed to include a tie rod arm 82 and a steer arm 84. Thus, the tie rod arm and steer arm are integrally formed together to have a continuous and uninterrupted surface extending from a first arm end 86 to a second arm end 88. The first arm end 86 includes a steer input mount interface 90 that is coupled to the cylinder 40. The second arm end 88 is coupled to the tie rod 32.

Figure 6A:
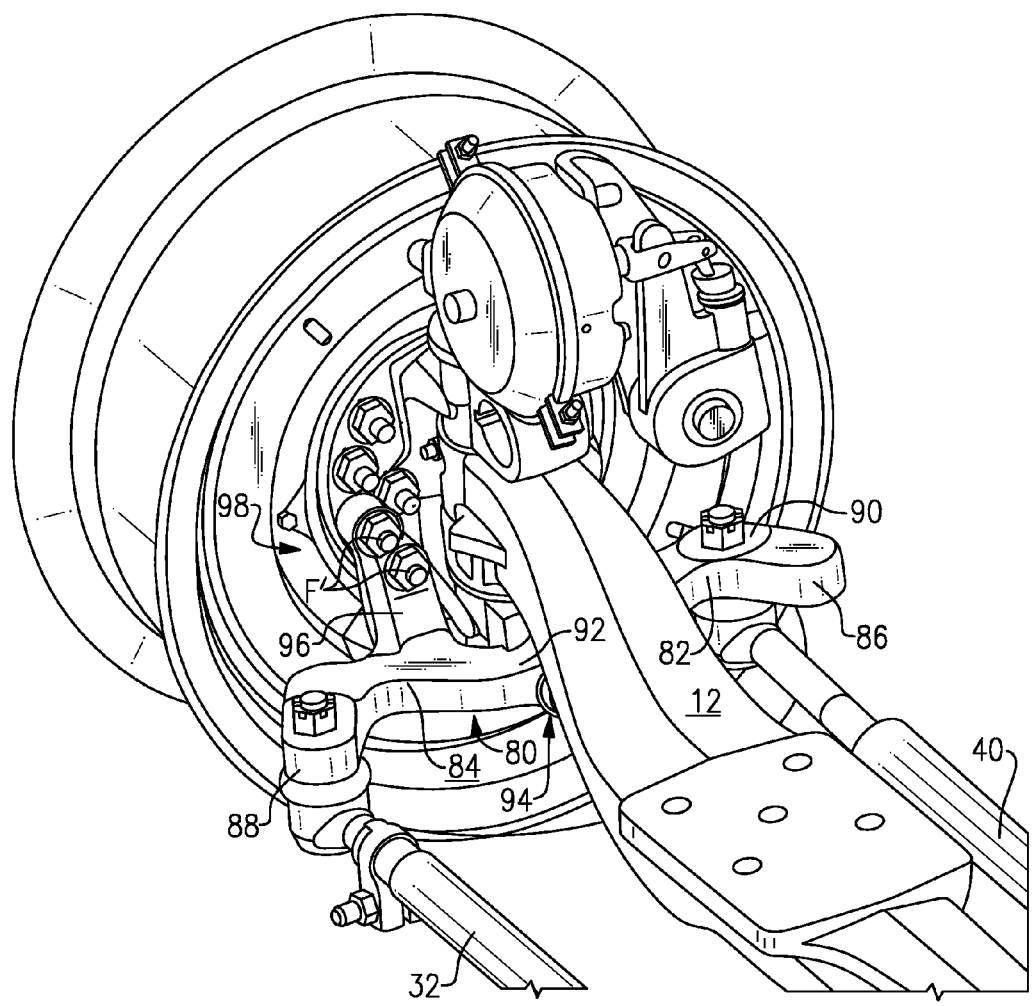
FIG. 6A shows an inboard view of the knuckle of FIG. 5 from one side of the axle assembly.
Figure 6C:
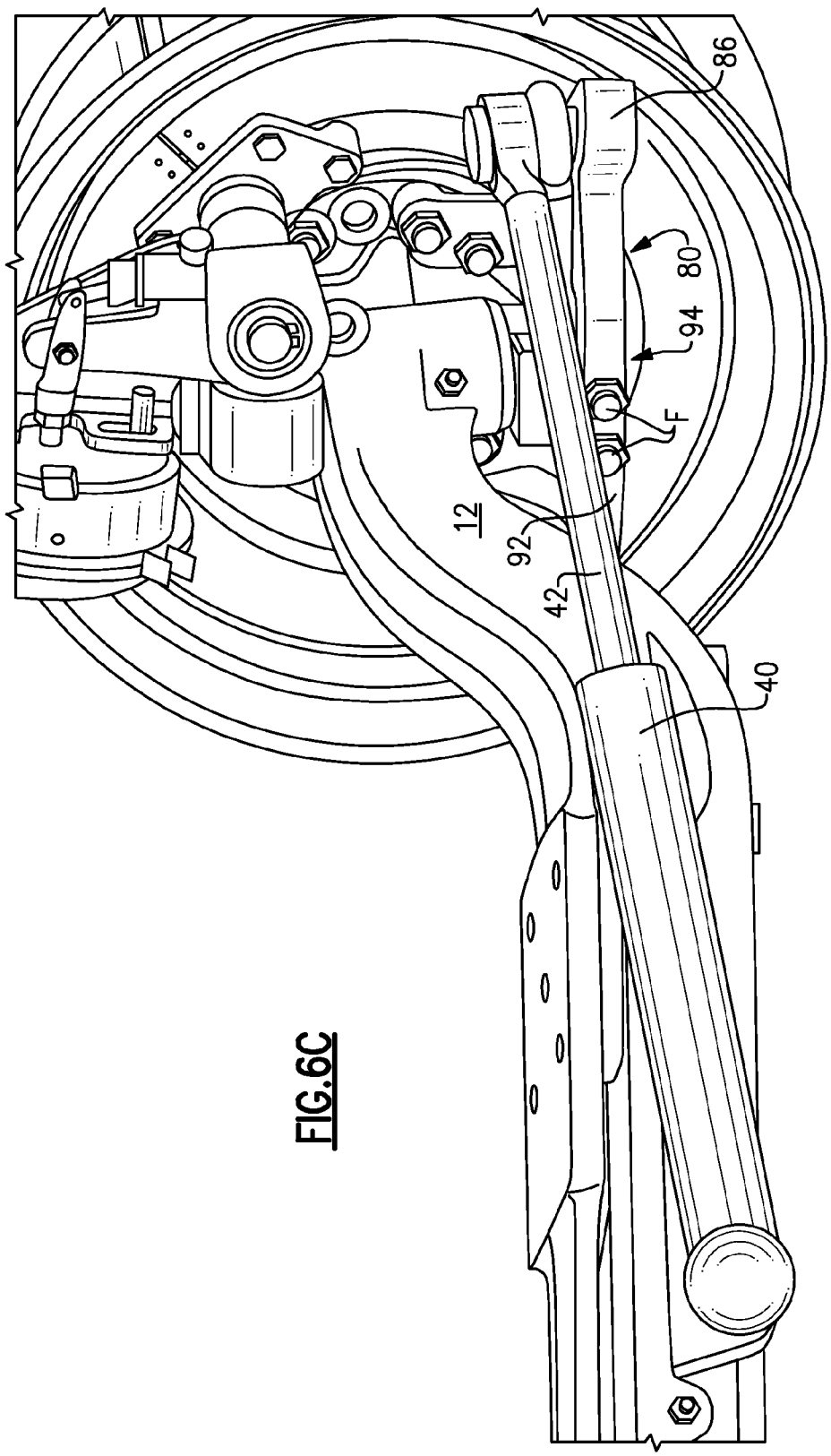
FIG. 6C shows the assembly of FIG. 6B with a steering system cylinder in an extended position.

The single-piece component 80 includes an intermediate portion 92 that is attached directly to the lower boss 20 of the knuckle 14 with one or more fasteners F at a first attachment interface 94 (FIG. 6C). The intermediate portion 92 also includes a pair of arm extensions 96 (FIGS. 6A-6B) that extend upwardly and outwardly toward the mounting flange 22. The arm extensions 96 are attached directly to the mounting flange 22 with one or more fasteners F' at a second attachment interface 98. The arm extensions 96 are positioned on opposite sides of the knuckle 14 to provide for additional support and stability.

This configuration offers the same advantages as discussed above with regard to the configuration shown in FIGS. 1-3. However, in this example, part of the lower boss 20 of the knuckle 14 would have to be machined to provide a flat mounting area 100 for the integrally formed arm. In the example shown, the flat mounting area 100 is positioned on an inboard side of the knuckle 14.

Figure 7A:
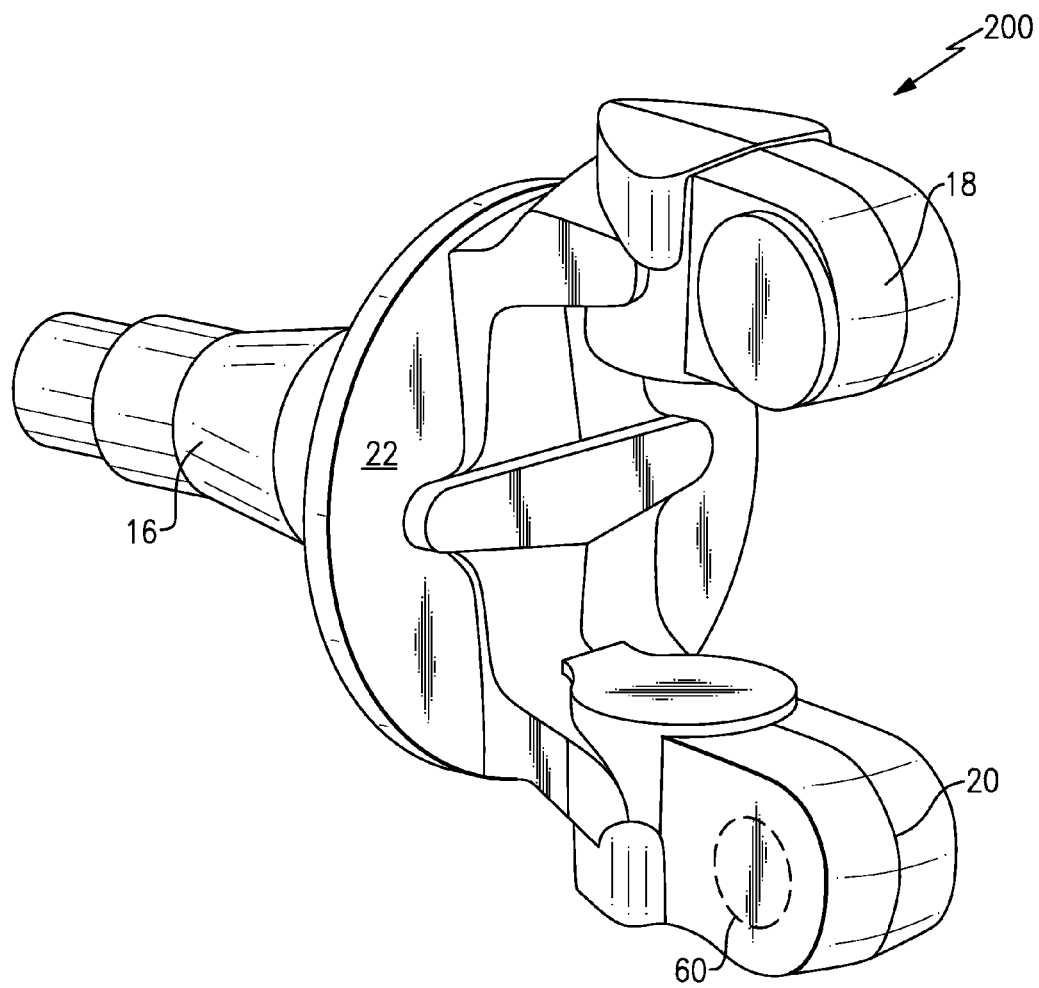
FIG. 7A is a perspective view of a knuckle as forged, and which can be finished to accommodate the steering arm of FIG. 2 or FIG. 5.
Figure 7B:
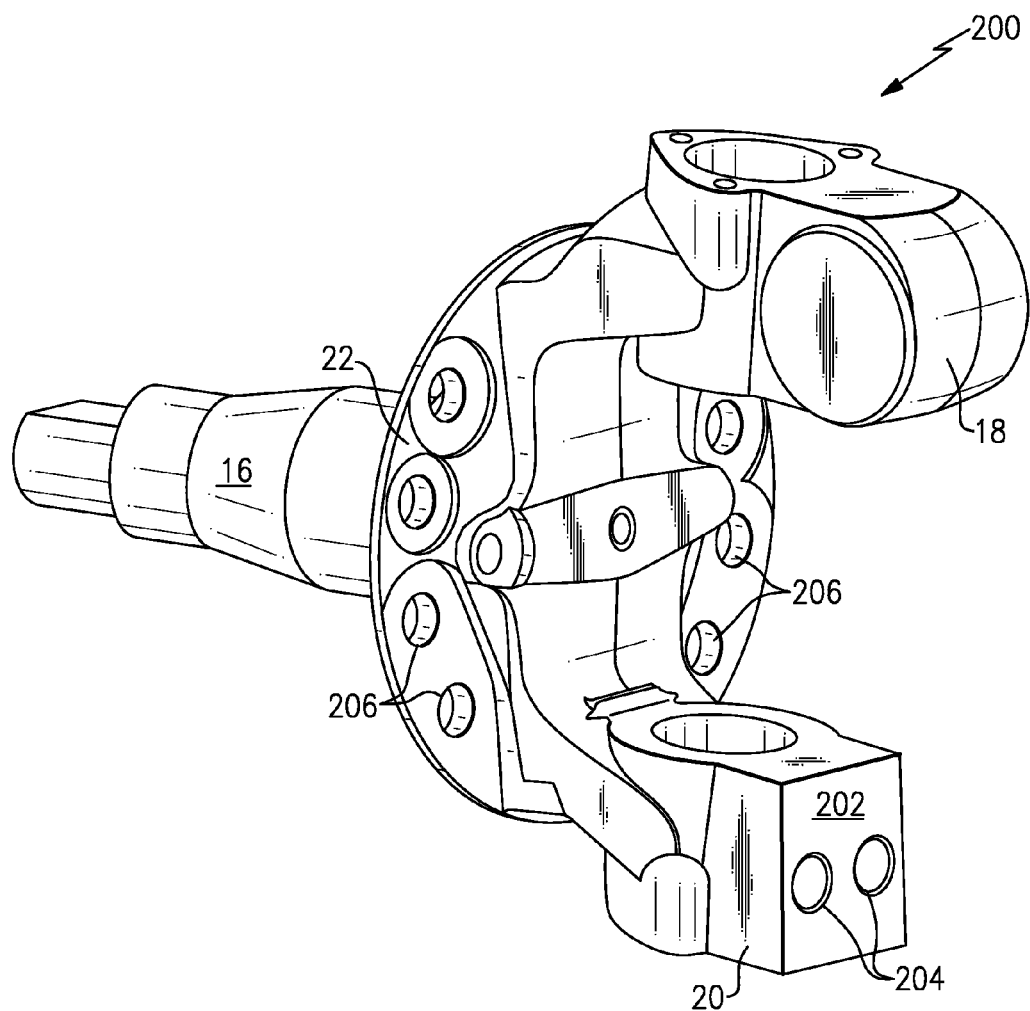
FIG. 7B is a perspective view showing the forged knuckle of FIG. 7A as modified to accept the arm of FIG. 5.

An example of an initially forged knuckle 200 is shown in FIG. 7A. The knuckle 200 can be machined to accommodate the arm configuration of FIG. 2 or FIG. 5. With the configuration of FIG. 2, the lower knuckle boss 20 is machined to include opening 60 to receive the second end 58 of the tie rod arm 30 as indicated with dashed lines in FIG. 7A. FIG. 7B shows a finished version for the arm configuration of FIG. 5 where the lower knuckle boss 20 has been cut to provide a flat machined surface 202 for attachment of the single-piece component 80 to the lower knuckle boss at attachment interface 94. A first set of holes 204 are machined to receive the fasteners F for the attachment interface 94 and a second set of holes 206 are machined to receive the fasteners F' for the attachment face 98.

While each knuckle is shown as having a steer arm as described above and as shown in FIGS. 1-6C, it should be understood that the subject steer arm could also be used in a configuration where only one of the knuckles includes a steer arm receiving steering input with the steering input being transferred to the other knuckle via the tie rod and associated tie rod arms.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A knuckle comprising:
a spindle to support a wheel;
an upper boss extending inwardly of said spindle;
a lower boss extending inwardly of said spindle and spaced vertically below said upper boss wherein said lower boss includes a tie rod arm mount interface;
a mount flange on an inboard end of said spindle at a location outboard of said upper and said lower bosses;
a tie rod arm associated with said tie rod arm mount interface;
a steer arm positioned on an opposite side of said knuckle from said tie rod arm, said steer arm being fixed to said tie rod arm and including an input mount interface to receive steering input to turn the wheel, and wherein said tie rod arm and said steer arm are integrally formed together as a single-piece component, said single-piece component having a first arm end coupled to a tie rod and a second arm end that is coupled to an input link at said input mount interface; and
wherein said single-piece component includes an intermediate portion that includes a first mount interface connected to said lower boss and a second mount interface connected to said mount flange.

2. The knuckle according to claim 1 wherein said steer arm and said tie rod arm comprise a structure that is attached to said lower boss as a unit.

3. The knuckle according to claim 1 wherein said steer arm and said tie rod arm comprise an integrally formed one-piece structure that is attached to said lower boss with at least one fastener.

4. An axle assembly comprising:
an axle beam laterally extending between first and second axle ends;
a first knuckle with a first king pin to secure said first knuckle to said axle beam at said first axle end;
a second knuckle with a second king pin to secure said second knuckle to said axle beam at said second axle end;
a first tie rod arm mounted to said first knuckle;
a second tie rod arm mounted to said second knuckle;
a tie rod having opposing ends respectively coupled to said first and said second tie rod arms;
at least one steer arm positioned on an opposite side of one of said first and said second knuckles from a respective one of said first and said second tie rod arms, said at least one steer arm being fixed to said respective one of said first and said second tie rod arms and including an input mount interface to receive steering input;
wherein said tie rod arm and said steer arm are integrally formed together as a single-piece component, said single-piece component having a first arm end coupled to said tie rod and a second arm end that is coupled to a steering input structure; and wherein said first and said second knuckles each include a mount flange, and wherein said single-piece component includes an intermediate portion that includes a first mount interface connected to said one of said first and said second knuckles and a second mount interface connected to said mount flange.

5. The axle assembly according to claim 4 wherein said steering input comprises a hydrostatic input.

6. The axle assembly according to claim 4 wherein said steering input comprises a mechanical linkage assembly.

7. The axle assembly according to claim 4 wherein said at least one steer arm comprises a first steer arm fixed to a lower boss of said first knuckle and to said first tie rod arm and a second steer arm fixed to a lower boss of said second knuckle and to said second tie rod arm.

8. The axle assembly according to claim 4 wherein said steer arm and said tie rod arm comprise a single structure that is attached to said one of said first and second knuckles as a unit.

9. The axle assembly according to claim 8 wherein said unit is attached to said one of said first and said second knuckles with at least one fastener.

10. An axle assembly comprising:
a axle beam laterally extending between first and second axle ends;
a first knuckle with a first king pin to secure said first knuckle to said axle beam at said first axle end;
a second knuckle with a second king pin to secure said second knuckle to said axle beam at said second axle end;
a first tie rod arm mounted to said first knuckle;
a second tie rod arm mounted to said second knuckle;
a tie rod having opposing ends respectively coupled to said first and said second tie rod arms; and
at least one steer arm positioned on an opposite side of one of said first and said second knuckles from a respective one of said first and said second tie rod arms, said at least one steer arm being fixed to said respective one of said first and said second tie rod arms and including an input mount interface to receive steering input, and wherein said steer arm and said tie rod arm comprise a single structure that is attached to said one of said first and second knuckles as a unit, and wherein said single structure comprises a continuous and uninterrupted surface extending from a first end at said input mount interface to a second end at a tie rod connection interface, and wherein said single structure includes an intermediate portion that is mounted to an inboard face of a lower boss of said one of said first and second knuckles with at least one fastener.

11. A knuckle comprising:
a spindle to support a wheel;
an upper boss extending inwardly of said spindle;
a lower boss extending inwardly of said spindle and spaced vertically below said upper boss wherein said lower boss includes a tie rod arm mount interface;
a tie rod arm associated with said tie rod arm mount interface; and
a steer arm positioned on an opposite side of said knuckle from said tie rod arm, said steer arm being fixed to said tie rod arm and including an input mount interface to receive steering input to turn the wheel, and wherein said steer arm and said tie rod arm comprise an integrally formed one-piece structure that is attached to said lower boss with at least one fastener, and wherein said one-piece structure comprises a continuous and uninterrupted surface extending from a first end at said input mount interface to a second end at a tie rod connection interface, and wherein said one-piece structure includes an intermediate portion that is mounted to said lower boss with said at least one fastener.

12. The knuckle according to claim 11 wherein said lower boss includes an inboard face and wherein said intermediate portion is directly fastened to said inboard face.

\* \* \* \* \*